Apr. 17, 1923.　　　　　　　　　　　　　　　　1,452,317
D. SIMON ET AL
HOOF PROTECTING HORSESHOE
Filed Dec. 14, 1921
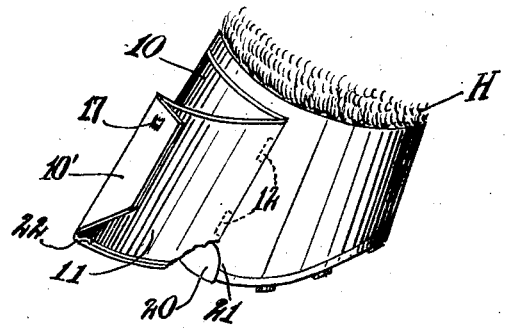
FIG.1
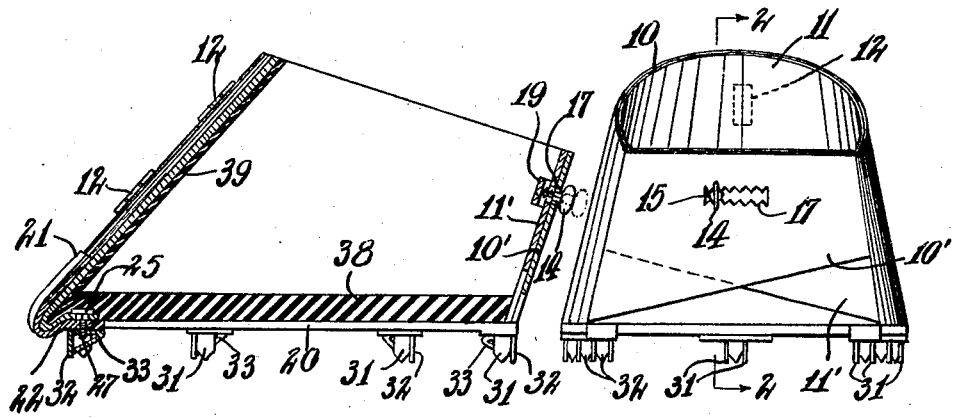
FIG.2　　　　　　　　　　FIG.3
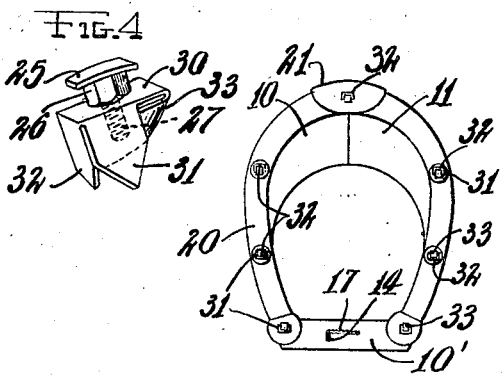
FIG.4　　　　　　　　　　FIG.5
FIG.6
Inventors
Dezsö Simon
Abraham Gottlieb
By
Attorney Patented Apr. 17, 1923.

1,452,317

UNITED STATES PATENT OFFICE.

DEZSÖ SIMON AND ABRAHAM GOTTLIEB, OF NEW YORK, N. Y.

HOOF-PROTECTING HORSESHOE.

Application filed December 14, 1921. Serial No. 522,260.

*To all whom it may concern:*

Be it known that we, DEZSÖ SIMON and ABRAHAM GOTTLIEB, citizens of Hungary and the United States, respectively, residing at New York, respectively, in the county of New York and State of New York, have invented certain new and useful Improvements in Hoof-Protecting Horseshoes, of which the following is a specification.

This invention relates generally to horseshoes and hoof protectors, having for one object to provide improved protection for the horse's hoof.

A further object of the invention is to provide a shoe capable of being attached to the hoof without the use of nails, and which permits of ready renewal of the calks when desired.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view showing our improved horseshoe in place upon the hoof of a horse, with the hoof protecting device partly open;

Fig. 2 is a longitudinal vertical sectional view of the shoe, this view being taken along the line 2—2 of Fig. 3;

Fig. 3 is a rear view thereof;

Fig. 4 is a detail perspective view of one of the calks;

Fig. 5 is a detail perspective view of the hoof section locking key; and

Fig. 6 is an underside plan view of the shoe.

In constructing our improved horseshoe we provide a collar adapted to enclose the hoof and split down the front into two sections 10 and 11 which are hinged together as at 12. The free ends of these collar sections are in the form of straight overlapping elements 10′ and 11′ which extend transversely behind the hoof, adjustable means being provided for securing these end elements to one another so that the collar may be fitted on hoofs of different sizes. This means comprises a key consisting of a flat head 14, a squared neck 15, and a diminished shank 16. The squared neck 15 is adapted to engage in serrations in the walls of registering slots 17 in the two collar elements 10′ and 11′. A coiled spring 18 is attached at one end to the shank 16 and at its other end to a strip 19 secured to the inner end element 11′. By pulling the key outward against spring 18 the neck 15 is freed from the slots 17 and the outer end element 10′ can be moved in either direction over the inner end element, the key being allowed to move back to locking position when the collar is properly adjusted.

The sole of the shoe, or shoe proper, comprises a flat strip 20 bent to ordinary horseshoe form and having at the front thereof an upwardly projecting tongue or tip 21 which closely engages the collar at the meeting line of the two sections 10 and 11 thereof. This member 20 is adapted to be secured to the collar by the same means that secures the calks in place.

As here shown the collar 10, 11 is provided at its lower edge with an inturned flange 22 which extends around the front and sides thereof, being omitted from the rear elements 10′, 11′. This flange 22 is provided with suitable openings through which the fastening screws are passed.

These fastening screws comprise each a head 25, a polygonal neck 26, and a threaded shank 27. The head 25 comprises a short bar which is slightly arched from end to end. The necks 26 of the screws engage in complementary apertures formed in the sole member 20, while the shanks 27 project downwardly from said member and have the calks threaded thereon.

Each calk comprises a flat plate 30 provided with a central threaded aperture through which the screw passes, this plate 30 having integral spikes 31 and 32 formed on the sides and one end thereof. To the opposite end of the plate to that at which the spike 32 is located is integrally attached a channelled member 33 which projects diagonally forward toward the end spike 32 and between the side spikes 31, this channeled member forming a shield or housing which protects the end of the screw.

In applying the calk to the shoe it is threaded upon the projecting end of the screw 27 and forced against the sole 20, binding the latter to the collar flange 22, as will be apparent. The arched screw head 25, which has a slight degree of resiliency, permits of the calks being positioned on the shoe at a desired angular adjustment, preferably with their side spikes 31 transversely disposed upon the shoe, the end spikes 32 being turned toward the front in the front calks and toward the rear in the rear calks as shown in Fig. 2. In addition the resilient arched heads 25 act as nut locks to assist in preventing the calks becoming loose.

Between the sole element 20 and the sole of the hoof, indicated at H, a rubber pad 38 is placed, a thinner rubber padding 39 being placed around the hoof between the latter and the collar 10, 11. The hoof is thus protected against jarring, by the cushioning effect of the pad 38.

In fitting our improved shoe upon the horse's hoof the collar 10, 11 is fitted on the hoof and held by the key 15, the screws being first inserted in the flange 22. The sole, or shoe proper, 20 is then placed against the flange 22, and the calks screwed on the projecting screws.

Having thus described our invention what we claim as new and desire to protect by Letters Patent of the United States is as follows:

1. A horseshoe comprising a collar adapted to fit around the hoof of the horse and being split at the front into two sections hinged to one another, a sole member fixed to said collar, the ends of said collar being adapted to overlap each other and being formed with slots which register when the collars are overlapped, the walls of said slots being formed with serrations, and a key having a squared portion adapted to engage in said serrations to lock the said sections together.

2. A horseshoe comprising an element adapted to removably engage the hoof of the horse and having a substantially horizontal bottom member, screws having their heads seating on said member and their bodies extending downward therethrough, the heads of the screws being formed by arched bars, and calks threaded on said screws against said bottom member.

3. A horseshoe comprising a collar adapted to fit around the hoof of the horse and being split at the front into two sections hinged to one another, a sole member fixed to said collar, and means for securing the free ends of the collar to one another in different adjusted positions, said means comprising a key having an enlarged neck, adapted to fit in different serrations in registering slots in the said free ends.

4. A horseshoe comprising a sectional collar adapted to fit around the hoof of the horse, an inturned flange at the bottom of the said collar, a sole member engaging said flange, screws having their heads seating on said flange and their bodies extending downward through said sole member, and calks threaded on said screws against said sole member.

5. A horseshoe comprising a sectional collar adapted to fit around the hoof of the horse, an inturned flange at the bottom of the said collar, a sole member engaging said flange, screws having their heads seating on said flange and their bodies extending downward through said sole member, and calks threaded on said screws against said sole member, said calks comprising plates engaging said sole member and having a pair of opposed side spikes and one end spike and a channeled element housing the projecting ends of the screws.

6. A horseshoe comprising a sectional collar adapted to fit around the hoof of the horse, an inturned flange at the bottom of the said collar, a sole member engaging said flange, screws having their heads seating on the said flange and their bodies extending downward through said sole member, and calks threaded on said screws against said sole member, said calks comprising plates engaging said sole member and having a pair of opposed side spikes and one end spike and a channeled element housing the projecting ends of the screws, the heads of said screws being formed by arched bars.

In testimony whereof we have affixed our signatures.

DEZSŐ SIMON.
ABRAHAM GOTTLIEB.